United States Patent
Yamamoto

(10) Patent No.: US 7,020,148 B1
(45) Date of Patent: Mar. 28, 2006

(54) DATA TRANSFERRING APPARATUS AND DATA TRANSFERRING METHOD THAT USE FAST RING CONNECTION

(75) Inventor: Mitsuhiro Yamamoto, Tokyo (JP)

(73) Assignee: NEC Electronics Corporation, Kanagawa (JP)

( * ) Notice: Subject to any disclaimer, the term of this patent is extended or adjusted under 35 U.S.C. 154(b) by 944 days.

(21) Appl. No.: 09/712,555

(22) Filed: Nov. 14, 2000

(30) Foreign Application Priority Data

Nov. 25, 1999 (JP) ............................. 1999/334632

(51) Int. Cl.
H04L 12/28 (2006.01)
H04L 12/43 (2006.01)

(52) U.S. Cl. ...................................... 370/403; 370/459
(58) Field of Classification Search ........ 370/403–406, 370/423, 424, 450, 451, 452, 458, 459, 460
See application file for complete search history.

(56) References Cited

U.S. PATENT DOCUMENTS

| | | | |
|---|---|---|---|
| 4,872,125 A * | 10/1989 | Catlin | 703/16 |
| 4,884,192 A * | 11/1989 | Terada et al. | 709/251 |
| 5,229,993 A * | 7/1993 | Foudriat et al. | 370/445 |
| 5,341,506 A * | 8/1994 | Nohmi et al. | 712/26 |
| 5,406,401 A * | 4/1995 | Kremer | 370/224 |
| 5,500,857 A * | 3/1996 | Nakata | 370/440 |
| 5,886,992 A * | 3/1999 | Raatikainen et al. | 370/410 |
| 5,911,056 A * | 6/1999 | Faget et al. | 710/305 |
| 6,026,094 A * | 2/2000 | Blatter | 370/447 |
| 6,115,756 A * | 9/2000 | Parady | 370/465 |
| 6,253,292 B1 * | 6/2001 | Jhang et al. | 711/146 |
| 6,501,761 B1 * | 12/2002 | Pannell et al. | 370/403 |

FOREIGN PATENT DOCUMENTS

| | | |
|---|---|---|
| JP | 52-87302 | 7/1977 |
| JP | 9-200239 | 7/1997 |

* cited by examiner

Primary Examiner—Chau Nguyen
Assistant Examiner—Andy Lee
(74) Attorney, Agent, or Firm—Choate, Hall & Stewart LLP

(57) ABSTRACT

A data transferring apparatus includes a ring bus, which circularly transfers data by holding in a slot to one direction and a plurality of nodes connected to the ring bus. Each of the plurality of nodes includes a detector and a controller. The detector detects whether or not data destined for a self-node is held in a slot arrived to another node connected to an upstream side of the self-node. The controller captures the data destined for the self-node from the slot when the detector detects presence of the data destined for the self-node and the slot arrives to the self-node.

14 Claims, 12 Drawing Sheets

DATA TRANSFERRING APPARATUS AND DATA TRANSFERRING METHOD THAT USE FAST RING CONNECTION

BACKGROUND OF THE INVENTION

1. Field of the Invention

The present invention relates to a data transferring apparatus and a data transferring method those employ a ring connection system. More particularly, the present invention relates to a technology to improve a usage efficiency of a ring bus.

2. Description of the Related Art

Conventionally, a bus connection system, a ring connection system, a switch connection system and the like have been well known as a connection system to transfer a data at a high speed among a plurality of processors. Because the ring connection system has a various advantages among these, various related arts have been proposed. For example, Japanese Laid Open Patent Application (JP-A-Heisei, 9-200239) discloses "DATA TRANSFERRING METHOD AND INFORMATION PROCESSING SYSTEM THAT USE RING CONNECTION" (hereafter, referred to as "Prior Art".

As shown in FIG. 1, the data information processing system disclosed in the prior art is provided with a ring bus 50 and a plurality of nodes (four nodes 0 to 3, in an illustrated example) connected to the ring bus 50. Each node is composed of a plurality of modules such as a processor, a memory controller for controlling and a memory, an input output controller for controlling an input output device (I/O) and a DMA (Direct Memory Access) controller.

In this information processing system, sending and receiving of a data is performed by using the packet that is transferred to one-way on ring bus 50. In FIG. 1, it is assumed that the packet is transferred. The operations of the information processing system will be described below.

At first, a writing operation in which each of the nodes 0 to 3 sends out the packet to the ring bus 50 is described. This information processing system is equipped with an independent selection line (not shown) in order that each node obtains a writing right, namely, a right to send out the packet to the ring bus 50.

Each of the nodes 0 to 3 sets the selection line to request the writing operation. By this operation, an investigation whether or not a slot arrived to a node on an upstream side of a self-node is an empty slot is performed. Each node recognizes the obtainment of the writing right, from a fact that a received signal from the selection line is not set, and generates a packet including write data to be transmitted until the empty slot arrives at the self-node. Then, each node sends out to the ring bus 50 the packet generated when the empty slot arrives at the self-node. The writing operation is completed as mentioned above.

Next, a reading operation in which each of the nodes 0 to 3 receives the packet from the ring bus 50 is described. Each of the nodes 0 to 3 transfers the packet sent from the node on the upstream side to a node on a downstream side in its original state, and at the same time, transiently stores in a buffer (not shown) all the packets sent from the node on the upstream side. A validation check of the packet stored in the buffer, namely, a check whether or not which is a packet for the self-node is performed at a cycle after the packet is transferred to the node on the downstream side. If the validity of the packet is confirmed, the packet is captured from the buffer in inside the node. The above configuration enables a reduction of latency of each node.

If the packet is captured from the buffer in inside the node, it is necessary to invalidate the transferred packet that is identical to the captured packet and exists on the ring bus 50. So, the node that captures the packet invalidates the transferred packet when it arrives at the self-node after a round of the ring bus 50. According to this configuration, since a packet, which goes around the ring bus 50, is captured at any node, the unnecessary packet can be surely invalidated. This invalidation enables the concerned slot on the ring bus 50 to be released. As a result, the concerned slot becomes an empty slot.

The operations of the conventional information processing system having the above-mentioned configuration will be described below with reference to a timing chart shown in FIG. 2. Let us suppose that this information processing system is operated under the following condition (1) to (3). It should be noted that, in FIG. 2, cycles assigned to the nodes 0 to 3 are represented by C0 to C3, respectively. The ring bus 50 is represented by RDATA[x], and valid data on this ring bus RDATA[x] is represent by N0 to N3.

(1) Condition 1: The valid data N0 from the node 2 to the node 0 exists on the ring bus.

(2) Condition 2: The node 0 holds write data to be transferred to the node 1.

(3) Condition 3: The node 1 holds write data to be transferred to the node 3.

In FIG. 2, the node 0 is operated as follows. That is, the node 0 receives the valid data N0 from the ring bus 50 at a node 0 cycle C0 (timing T3), and stores in the buffer, also transfers to the next node 1 at the same time. The node 0 holds the write data to be transferred to the node 1. However, the validation check of the data stored in the buffer is done later. Thus, it is impossible to execute the invalidation and send out the write data at the timing T3. Hence, the node 0 waits until an arrival of a next node 0 cycle C0.

The valid data N0 is send out from the node 2 to the ring bus 50 at a node 2 cycle C2 (timing T1). Thus, this valid data N0 is invalidated at a node 2 cycle C2 (timing T5). As a result, the concerned slot becomes an empty slot at the node 2 cycle C2 (timing T5). Its state is maintained even at a next node 3 cycle C3 (timing T6). The node 0 obtains a writing right since the concerned slot becomes an empty slot at a node 3 cycle C3 (timing T6), and sends out as a valid data N1 to the ring bus 50 at a next node 0 cycle C0 (timing T7). This valid data N1 is invalidated at a next node 0 cycle C0 (timing T11).

The node 1 is operated as described below. That is, as mentioned above, the valid data N0 is invalidated at the node 2 cycle C2 (timing T5). Thus, the node 1 holds the write data to be transferred to the node 3, but it can not obtain the writing right since the valid data N0 remains on the ring bus 50 at a node 0 cycle C0 (timing T3). Hence, it waits until an arrival of a next node 1 cycle C1.

At a next node 1 cycle C1 (timing T8), the node 1 receives the valid data N1 sent out from the node 0 at the timing T7. However, it is only the node 0 that can invalidate the valid data N1. Thus, at the timing T8, it is impossible to carry out the invalidation or send out the write data. So, the node 1 further waits until an arrival of the next node 1 cycle C1.

The valid data N1 is sent out from the node 0 to the ring bus 50 at the node 0 cycle C0 (timing T7). Thus, this is invalidated at the node 0 cycle C0 (timing T11). As a result, the concerned slot becomes an empty slot at the node 0 cycle C0 (timing T11). The node 1 obtains the writing right since the concerned slot becomes the empty slot at the node 0 cycle C0 (timing T11) and sends out as a valid data N3 to the ring bus 50 at a next node 1 cycle C1 (timing T12). The node 3 captures this valid data N3 at a node 3 cycle C3 (timing T14).

In the conventional information processing system, the above-mentioned operations are repeated to transfer the data between the plurality of nodes connected to the ring bus. In the conventional information processing system, 14 clocks are required until the completion of the data transfer under the above-mentioned conditions 1 to 3.

As mentioned above, in the conventional information processing system, the validation check of the received data is executed after the received data is captured within the node. Thus, it is impossible to invalidate the received data and write a new data, simultaneously with the reception of the valid data from the ring bus.

In this case, the received data is invalidated after the one round of the ring bus. Thus, after the capture of the valid data, although the data within the slot is originally unnecessary, it occupies the slot until the invalidation is performed. Also, when the node receives the valid data in such a condition that it holds the data to be transmitted, although the transmission data can be sent out by using the slot which was occupied by the captured valid data, it is held until a data identical to the captured data makes a round of the ring bus. As a result, the use efficiency of the ring bus declines.

SUMMARY OF THE INVENTION

The present invention has been made to solve the above-described conventional drawbacks, and therefore, has an object to provide a data transferring apparatus and a data transferring method which can improve a usage efficiency of a ring bus.

A data transferring apparatus according to a aspect of the present invention, in order to attain the above-mentioned objects, includes a ring bus which circularly transfers data by holding in a slot to one direction and a plurality of nodes which are connected to the ring bus.

Each of the plurality of nodes includes a detector and a controller. The detector detects whether or not data destined for a self-node is held in a slot arrived to another node connected to an upstream side of the self-node. The controller captures the data destined for the self-node from the slot when the detector detects presence of the data destined for the self-node and the slot arrives to the self-node.

A data transferring method according to another aspect of the present invention, in order to attain the above-mentioned objects, includes providing step, detecting step and capturing step. In the providing step, a plurality of nodes and a ring bus are provided. The plurality of nodes are connected to the ring bus. The ring bus circularly transfers data by holding in a slot to one direction.

In the detecting step, such a fact is detected that whether or not data destined for a self-node is held in a slot arrived to another node connected to an upstream side of the self-node. In the capturing step, the data destined for the self-node from the slot is captured when presence of the data destined for the self-node is detected in the detecting step and the slot arrives to the self-node.

DESCRIPTION OF THE PREFERRED EMBODIMENTS

Now, embodiments of the present invention will be described below with reference to the attached drawings. It should be noted that a data transferring apparatus in which four nodes are connected to a ring bus is described for the purpose of simple explanation, but the number of nodes in the data transferring apparatus according to the present invention is not limited to 4. Also, the configuration and the operation for the reading operation, which are the features of the present invention, will be mainly described below.

(Overview of Embodiment)

Figure 1:
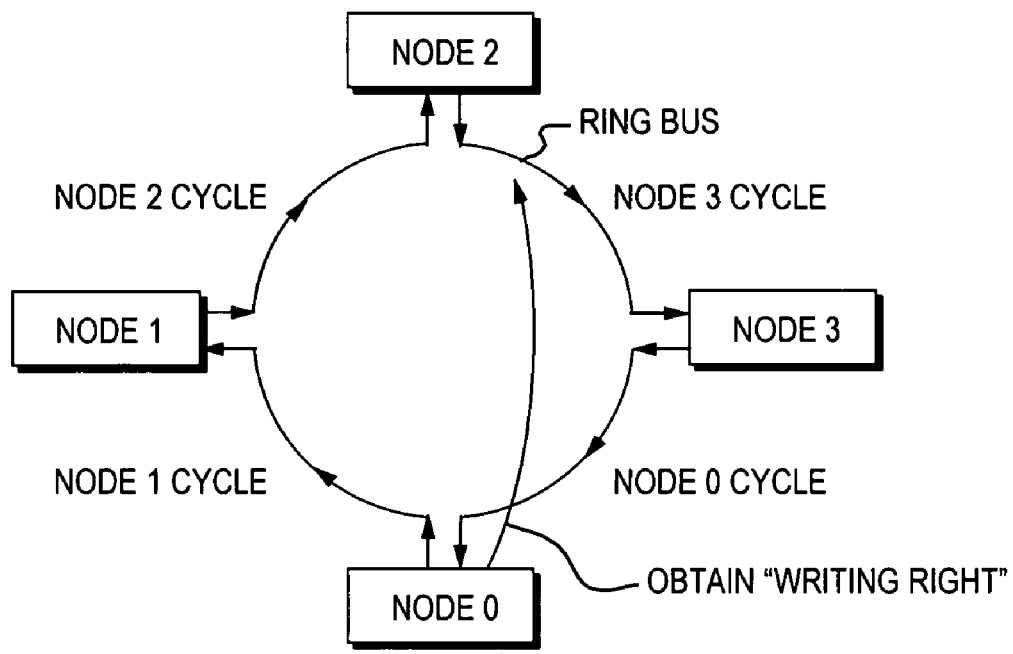
FIG. 1 is a view showing a configuration of an information processing system employing a conventional ring bus connection system.
Figure 2:
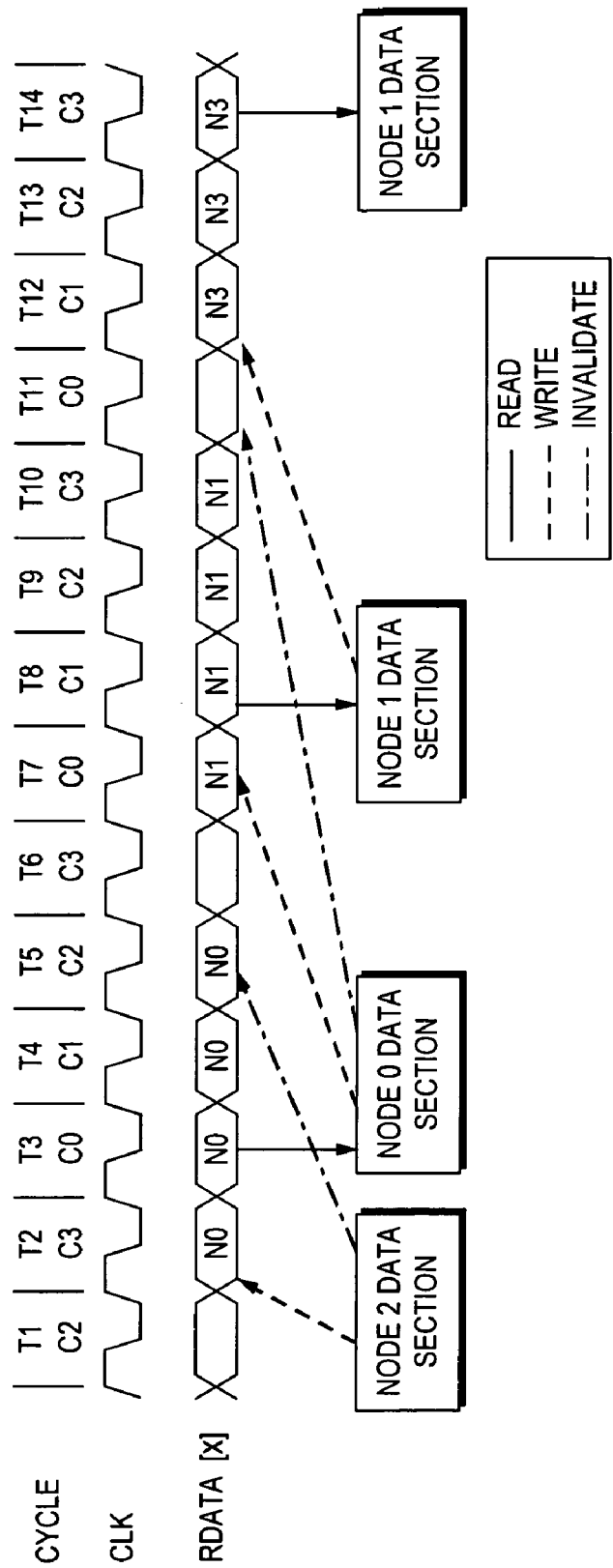
FIG. 2 is a timing chart showing an operation of the information processing system shown in FIG. 1.
Figure 3:
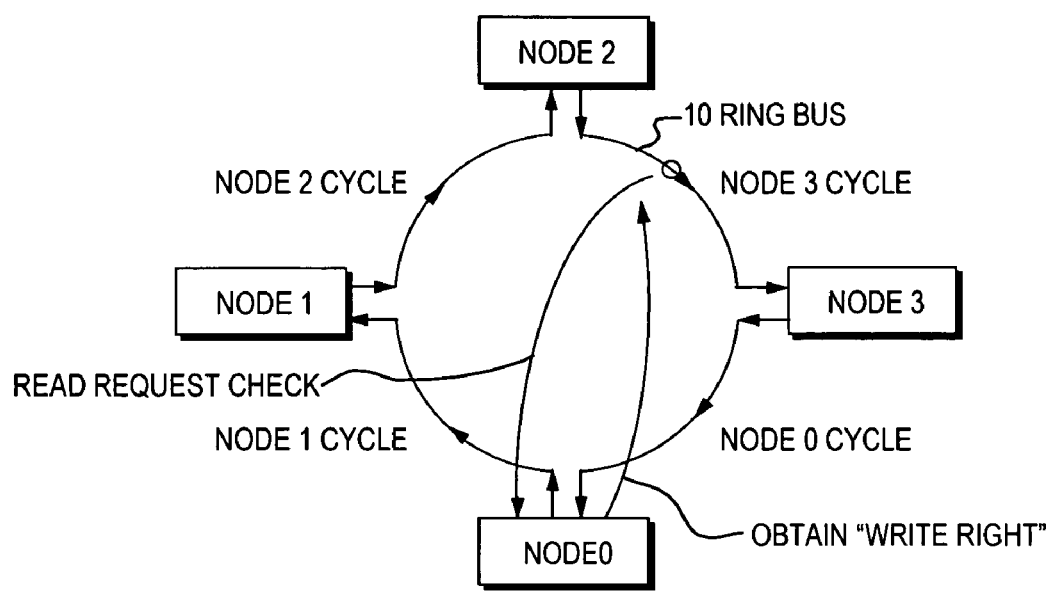
FIG. 3 is a block diagram showing a schematic configuration of a data transferring apparatus, which employs a ring connection system, according to an embodiment of the present invention.

First, the schema of the data transferring apparatus according to an embodiment of the present invention is described. This data transferring apparatus is composed of a ring bus 10 and four nodes 0 to 3 connected to this ring bus 10, as shown in FIG. 3. As each node, such a module that includes a processor, a memory controller, an input output controller and a DMA controller can be used.

The ring bus 10 is constituted by a data bus having a bus width of 32 bits. It should be noted that the bus width of the ring bus 10 is assumed to be 32 bits in this embodiment, but the bus width of the ring bus 10 is not limited to 32 bits, and it is free. This ring bus 10 connects the adjacent nodes to each other.

In this data transferring apparatus, sending and receiving of a data is performed by using a packet that is transferred clockwise on the ring bus 10. That is, the packet on the ring bus 10 is transferred to a node on a downstream side for each cycle. Thus, the packet goes around the ring bus 10 at four cycles. One cycle in the four cycles is assigned to each of the nodes 0 to 3. Each of them is referred to as a node 0 cycle, a node 1 cycle, a node 2 cycle and a node 3 cycle. Also, each cycle is referred to as a slot. Therefore, it may be considered that this data transferring apparatus sends and receives a data while the four slots linked in a form of ring are shifted clockwise for each cycle on the ring bus 10.

In this data transferring apparatus, only in the cycle assigned to the self-node, each node can send out (write) the packet to the ring bus 10 and receive (read) the packet from the ring bus 10. For example, the node 0 can read and write the packet only when the node 0 cycle is arrived.

Figure 4:
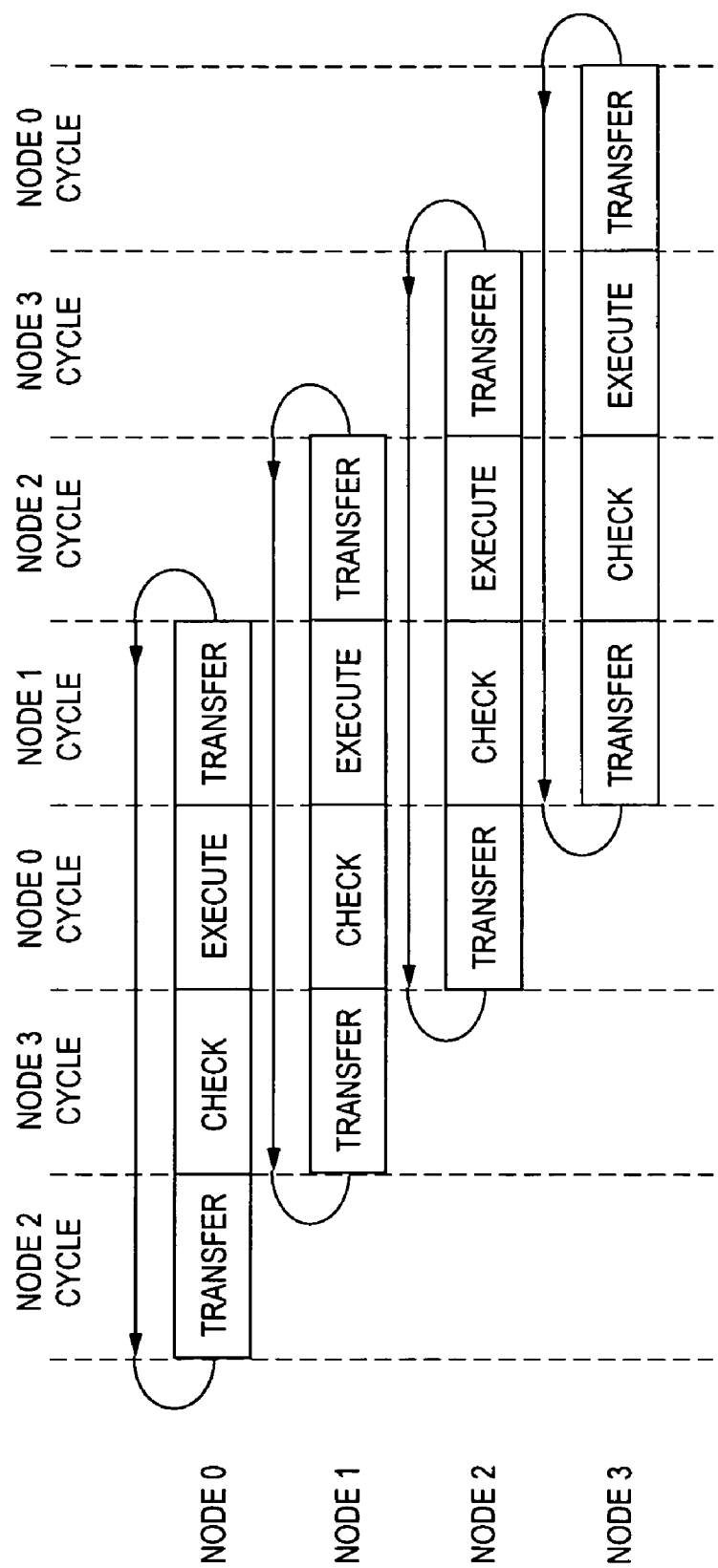
FIG. 4 is a view describing a schematic operation of the data transferring apparatus shown in FIG. 3.

FIG. 4 shows the schematic operation of the data transferring apparatus having the above-mentioned configuration. Now, when paying attention to the node 0, the node 0 checks the node 3 cycle (CHECK). In this check, the plural operations are carried out, such as a check as to whether or not a read request to the self-node 0 is present in the node 3 cycle, a preparation to read a packet, a check as to whether or not the slot of the node 3 cycle is being used, a generation of a packet including write data to be sent out, a preparation for a writing operation, a preparation for an invalidation and the like.

Also, the node 0 executes the reading operation and the writing operation of the packet at the node 0 cycle (EXECUTE). In the node 1 cycle and the node 2 cycle (TRANSFER), the node 0 merely transfers the packet sent from the node 3 to the node 1. The operations of the other nodes are similar to the above-mentioned operation of the node 0.

Figure 5:
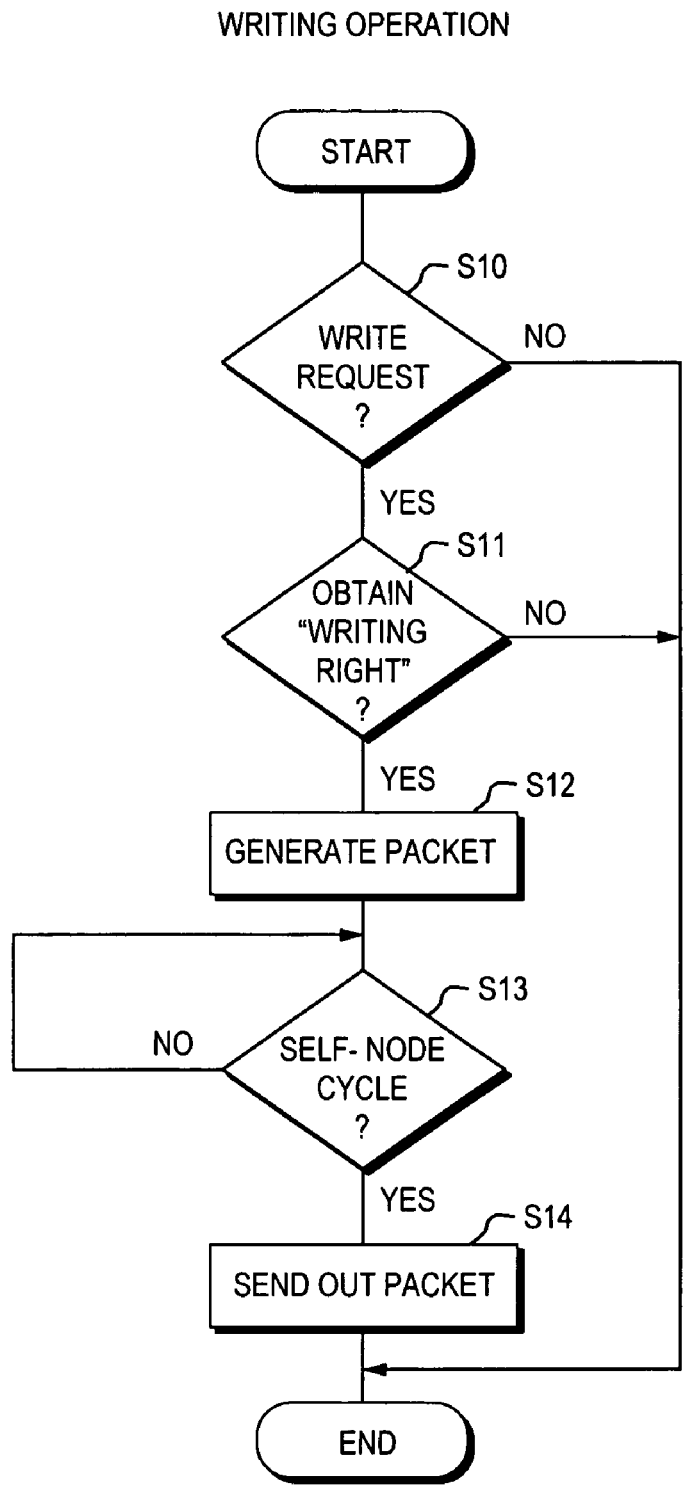
FIG. 5 is a flowchart showing a writing operation of each node in the data transferring apparatus shown in FIG. 3.

Next, the operations of the data transferring apparatus will be described below in further detail. First, the writing operation is described with reference to a flowchart shown in FIG. 5. Because the operations of the respective nodes are equal to each other, only the operations of the node 0 will be described below.

Now, let us consider such a case that the cycles of the respective nodes are set in the condition shown in FIG. 3. The node 0 firstly investigates whether or not a write request is present therein (Step S10). If it is judged that the write request is present, the node 0 investigates whether or not it is possible to obtain a writing right, namely, a right to send out a packet to the ring bus 10 (Step S11). This is performed by investigating whether or not the slot (node 3 cycle) arrived to the adjacent node 3 on the upstream side of the self-node 0 is empty or whether or not a data destined for the self-node 0 is present in the slot (node 3 cycle).

If it is judged that the writing right can be obtained, the node 0 generates the packet including the write data to be sent out (Step S12). The node 0 investigates whether or not the cycle of the self-node (node 0 cycle) arrives (Step S13). In this step S13, if it is judged that the cycle of the self-node does not arrive, namely, if it is judged that a timing to write the data does not arrive, the node 0 waits until the arrival of the timing in which the data can be written. If it is judged that the cycle of the self- node arrives, the node 0 sends out the packet generated at the step S12 to the ring bus 10 (Step S14). Accordingly, the operation for sending out the packet is completed.

If it is judged at the step S10 that the write request is not present, the writing operation is not executed. Also, at the step S11, if it is judged that the writing right can not be obtained, namely, the node 3 cycle is not an empty slot, the writing operation is not executed. In this case, the write request is suspended. The above-mentioned operations are executed at a next cycle.

Figure 6:
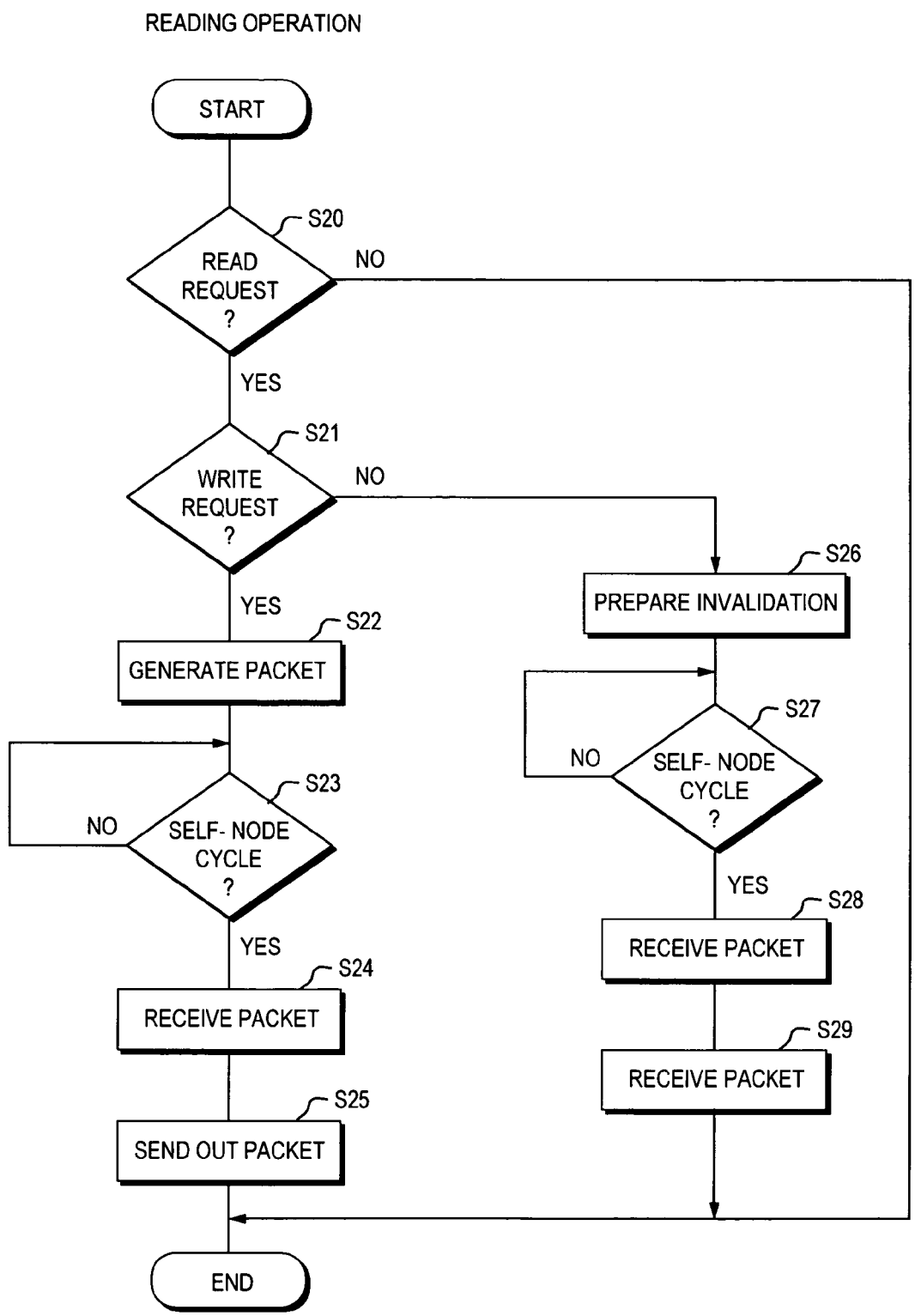
FIG. 6 is a flowchart showing a reading operation of each node in the data transferring apparatus shown in FIG. 3.

Next, the reading operation will be described below with reference to a flowchart shown in FIG. 6. Now, let us consider such a case that the cycles of the respective nodes are set in the condition shown in FIG. 3.

The node 0 firstly investigates whether or not a data transfer request (read request) to the self-node 0 from another node is present (Step S20). This is performed by investigating whether or not the packet destined for the self-node is present in the slot (node 3 cycle) arrived to the adjacent node 3 on the upstream side of the self-node.

If it is judged that the packet destined for the self-node is present, the node 0 investigates whether or not the write request is present therein (Step S21). If it is judged that the write request is present, the packet including the write data to be sent out is generated (Step S22).

Thereafter, the node 0 investigates whether or not the cycle of the self-node (node 0 cycle), namely, a write timing arrives (Step S23). In this step 23, if it is judged that the write timing does not arrive, the node 0 waits until the arrival of the write timing. If it is judged that the write timing arrives, the node 0 receives the packet from the ring bus 10 (Step S24). Next, the packet generated at the step S22 is sent out to the ring bus 10 (Step S24). Accordingly, the operations for receiving the packet and sending out the other packet are completed within one cycle.

When it is judged at the step S21 that the write request is not present, the node 0 performs preparation for the invalidation (Step S26). Then, the node 0 investigates whether or not the cycle of the self-node (node 0 cycle), namely, the read timing arrives (Step S27). In this step 27, if it is judged that the read timing does not arrive, the node 0 waits until the arrival of the read timing. If it is judged that the read timing arrives, the node 0 receives the packet from the ring bus 10 (Step S28). Then, the invalidation is executed (Step S29). Thus, the reception of the packet is completed, and the slot in which the received packet is present is made empty. At the step S20, if it is judged that the data transfer to the self-node 0 from another node is not present, the data from the adjacent node on the upstream side is transferred to an adjacent node on a downstream side.

The operations of the data transferring apparatus having the above-mentioned configuration will be described below in further detail with reference to a timing chart shown in FIG. 7, under the same conditions 1 to 3 explained in the "Description of the Related Art".

Figure 7:
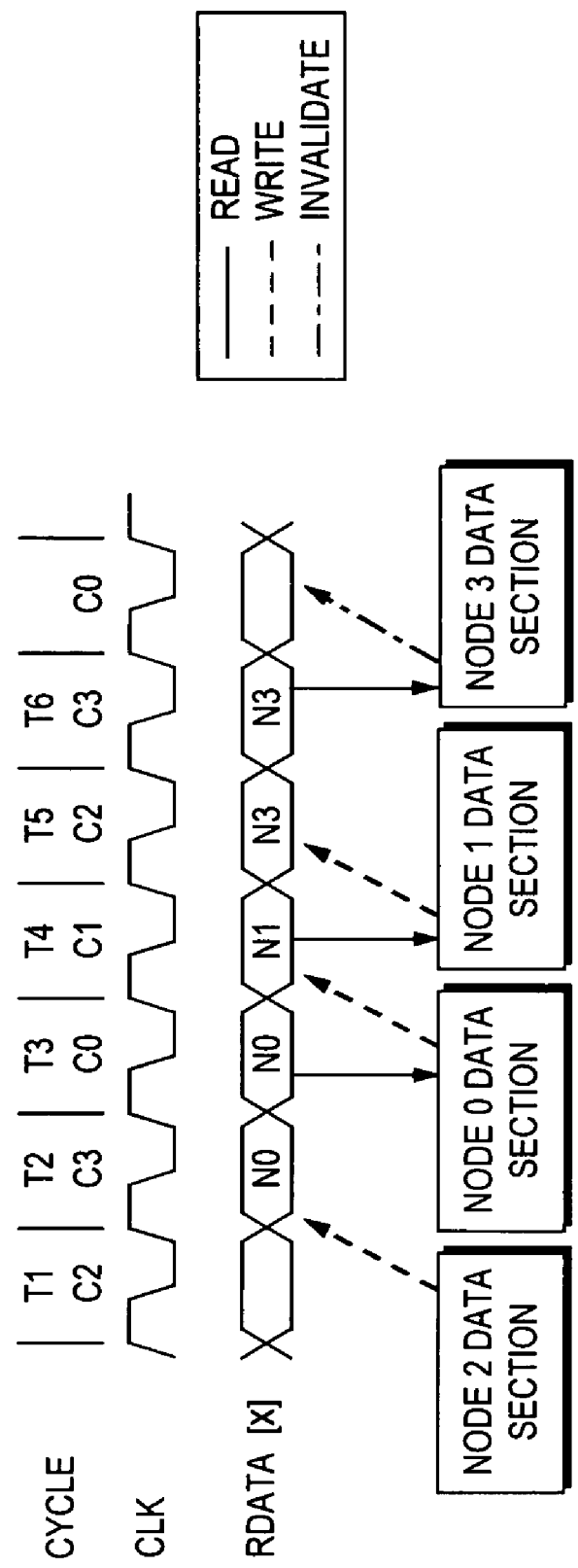
FIG. 7 is a timing chart showing an operation of the data transferring apparatus shown in FIG. 3.

In FIG. 7, in the node 3 cycle C3 (timing T2), the node 0 checks that the valid data N0 to the self-node 0 is present on the ring bus 10 and that it can be received at the next node 0 cycle C0. Also, the node 0, since holding the write data destined for the node 1, generates the packet including the write data when the above-mentioned check can be attained.

The node 0 receives the valid data N0 from the ring bus 10 at the next node 0 cycle C0 (timing T3), and at the same time, sends out the packet including the write data, to the ring bus 10. This packet becomes a valid data N1 at the next node 1 cycle C1 (timing T4) on the ring bus 10.

On the other hand, the node 1 confirms that the valid data N1 to the self-node 1 is generated as a packet at the node 0 cycle C0 (timing T3) and that it can be received at the next node 1 cycle C1. Also, the node 1, since holding write data destined for the node 3, generates the packet including the write data if the above-mentioned confirmation can be attained.

The node 1 receives the valid data N1 from the ring bus 10 at the next node 1 cycle C1 (timing T4), and at the same time, sends out the packet including the write data, to the ring bus 10. This packet becomes a valid data N3 at the next node 2 cycle C2 (timing T5) on the ring bus 10.

Moreover, the node 3 confirms that the valid data N3 to the self-node 3 is present on the ring bus 10 at the node 2 cycle C2 (timing T5) and that it can be received at the next node 3 cycle C3. Also, the node 3, since the node 1 does not hold the write data destined for the node 3, performs preparation for the invalidation if the above-mentioned confirmation can be attained.

The node 3 receives the valid data N3 from the ring bus 10 at the next node 3 cycle C3 (timing T6), and at the same time, invalidates the slot. The slot becomes an empty slot at the next node 0 cycle C0.

The data transferring apparatus having the above-mentioned configuration requires only six clocks until the completion of the data transfer under the above-mentioned conditions 1 to 3. On the contrary, as described above, the conventional information processing system requires the 14 clocks until the completion of the similar data transfer. In the data transferring apparatus according to this embodiment, because the unnecessary packet does not occupy the ring bus, the usage efficiency of the ring bus can be raised. As a result, the time necessary for the data transfer can be largely reduced.

FIRST EXAMPLE

A data transferring apparatus according to a first example of the present invention will be described below. The schematically described data transferring apparatus is further embodied in the data transferring apparatus according to the first example. This data transferring apparatus checks whether or not the packet destined for the self-node is present in the slot arrived to the adjacent node on the upstream side of the self-node by referring two ID lines indicative of a node number and one valid line.

Figure 8:
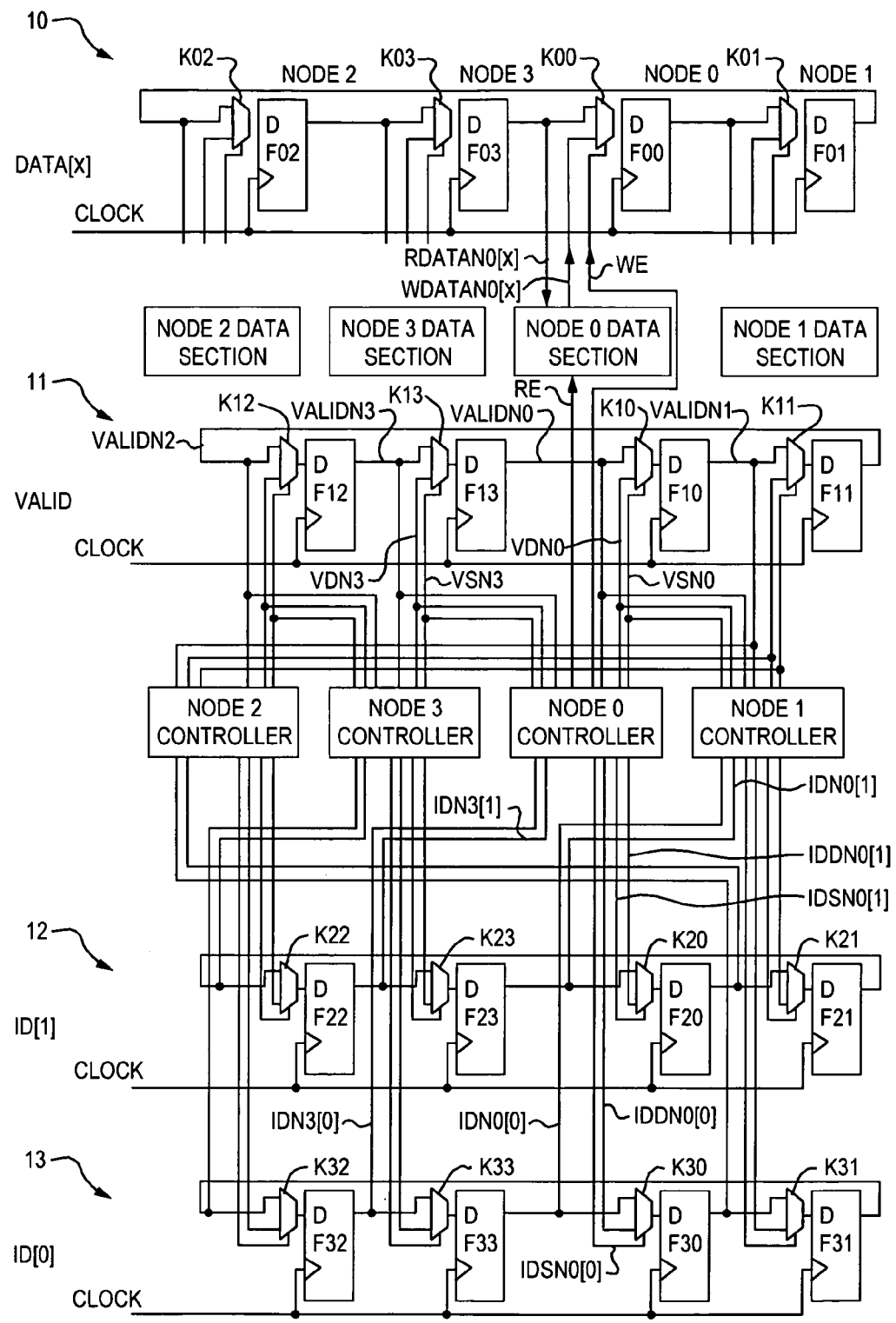
FIG. 8 is a block diagram showing a configuration of a data transferring apparatus according to a first embodiment of the present invention.

FIG. 8 is a block diagram showing the configuration of the data transferring apparatus according to the first example. This data transferring apparatus is composed of a ring bus 10, a valid line (VALID) 11, a first ID line (ID[1]) 12, a second ID line (ID[0]) 13, a node 0, a node 1, a node 2 and a node 3. The node 0 is composed of a node 0 data section and a node 0 controller. The node 1 is composed of a node 1 data section and a node 1 controller. The node 2 is composed of a node 2 data section and a node 2 controller. Also, the node 3 is composed of a node 3 data section and a node 3 controller.

The ring bus 10 is configured such that four D-type flip-flops F00 to F03 having selectors K00 to K03 at data input terminals, respectively, are connected in a form of ring. The flip-flops F00 to F03 correspond to the nodes 0 to 3, respectively. A clock is commonly supplied to the respective flip-flops. An output terminal of the flip-flop F03 is connected to one input terminal of the selector K00 provided at the flip-flop F00, and write data WDATAN0[x] is sent to another input terminal of the selector K00 from the node 0 data section. Also, a write enable signal WE from the node 0 controller is supplied to a selection terminal of the selector K00. The selector K00 selects one of the output signal from the flip-flop F03 and the write data WDATAN0[x] from the node 0 controller, in accordance with the write enable signal WE, and sends to the data input terminal of the flip-flop F00. Moreover, the output signal from the flip-flop F03 is sent to the node 0 data section. The configurations for the nodes 1 to 3 are equal to that of the node 1. However, in FIG. 8, a part of the connection lines is omitted in order to avoid the complex drawing. Also, each of the flip-flops F00 to F03 is provided correspondingly to a data bus width x. However, they are omitted because of the reason similar to the above-mentioned reason.

The valid line 11 is configured such that four D-type flip-flops F10 to F13 having selectors K10 to K13 at data input terminals, respectively, are connected in a form of ring. The flip-flops F10 to F13 correspond to the nodes 0 to 3, respectively. A clock is commonly supplied to the respective flip-flops. An output terminal of the flip-flop F13 is connected to one input terminal of the selector K10 provided at the flip-flop F10, and a signal VDN0 is sent to another input terminal of the selector K10 from the node 0 controller. Also, a signal VSN0 from the node 0 controller is supplied to a selection terminal of the selector K10. The selector K10 selects one of the output signal from the flip-flop F13 and the signal VDN0 from the node 0 controller, in accordance with the signal VSN0, and sends to the data input terminal of the flip-flop F10. Moreover, the output signal from the flip-flop F13 is sent to the node 0 controller. Configurations of circuits around the other flip-flops F11 to F13 are similar to those of the flip-flop F10.

The first ID line 12 is configured such that four D-type flip-flops F20 to F23 having selectors K20 to K23 at data input terminals, respectively, are connected in a form of ring. The flip-flops F20 to F23 correspond to the nodes 0 to 3, respectively. A clock is commonly supplied to the respective flip-flops. An output terminal of the flip-flop F23 is connected to one input terminal of the selector K20 provided at the flip-flop F20, and a signal IDDN0[1] is sent to another input terminal of the selector K20 from the node 0 controller. Also, a signal IDSN0[1] from the node 0 controller is supplied to a selection terminal of the selector K20. The selector K20 selects one of the output signal from the flip-flop F23 and the signal IDDN0[1] from the node 0 controller in accordance with the signal IDSN0[1], and sends to a data input terminal of the flip-flop F20. Moreover, the output signal from the flip-flop F22 is sent to the node 0 controller. Configurations for the nodes 1 to 3 are similar to that of the node 0.

Similarly, the second ID line 13 is configured such that four D-type flip-flops F30 to F33 having selectors K30 to K33 at data input terminals, respectively, are connected in a form of ring. The flip-flops F30 to F33 correspond to the nodes 0 to 3, respectively. A clock is commonly supplied to the respective flip-flops. An output terminal of the flip-flop F33 is connected to one input terminal of the selector K30 provided at the flip-flop F30, and a signal IDDN0[0] is sent to another input terminal of the selector K30 from the node 0 controller. A signal IDSN0[0] from the node 0 controller is supplied to a selection terminal of the selector K30. The selector K30 selects one of the output signal from the flip-flop F33 and the signal IDDN0[0] from the node 0 controller in accordance with the signal IDSN0[0], and sends to a data input terminal of the flip-flop F30. Moreover, the output signal from the flip-flop F32 is sent to the node 0 controller. Configurations for the nodes 1 to 3 are similar to that of the node 0.

Now, the operations of the data transferring apparatus having the above-mentioned configuration will be described below with reference to a timing chart shown in FIG. 9. This timing chart shows the case of the operation under the above-mentioned conditions 1 to 3.

Figure 9:
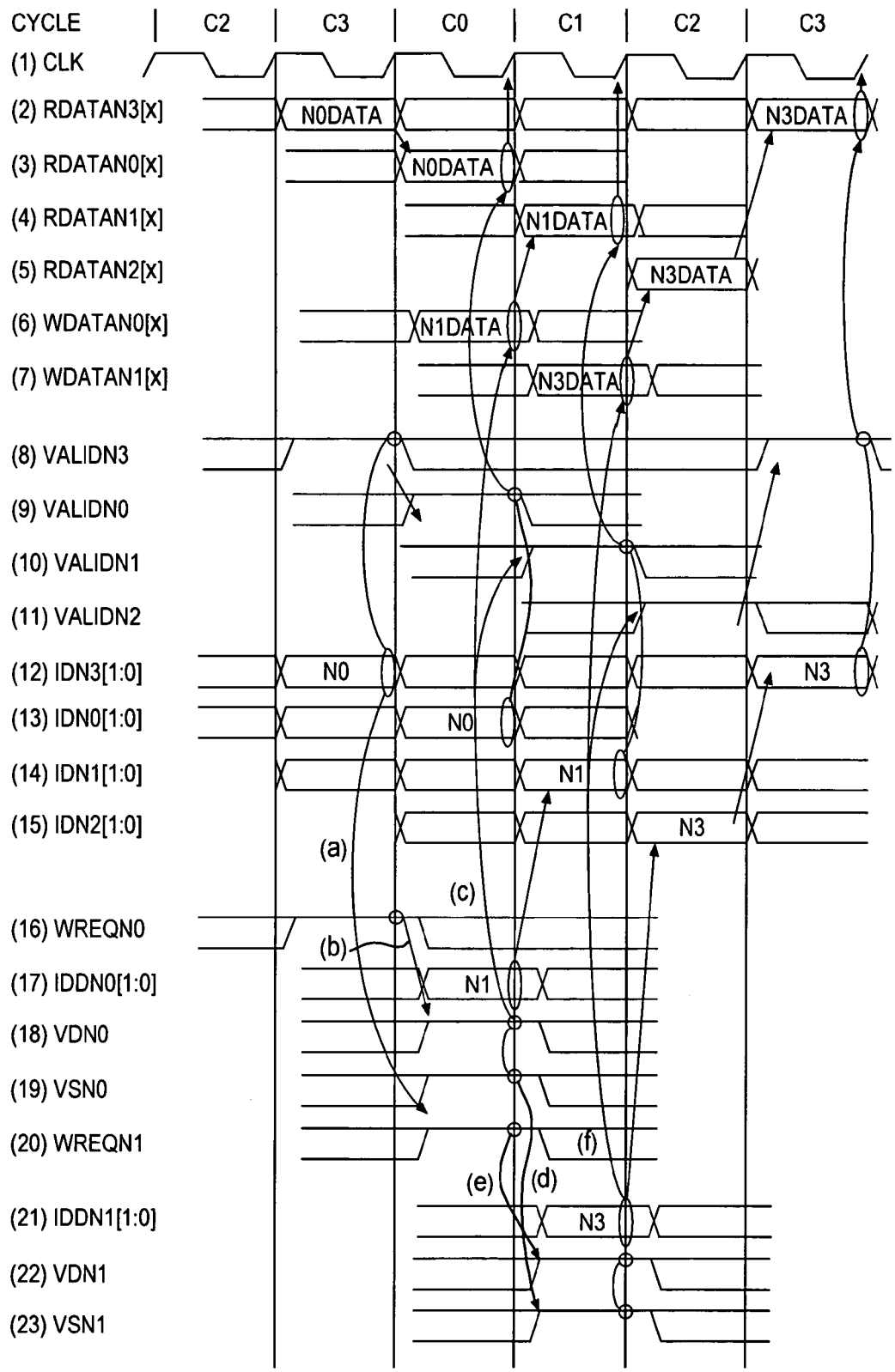
FIG. 9 is a timing chart showing an operation of the data transferring apparatus shown in FIG. 8.

First, as shown in FIG. 9 (2), a valid data on a ring bus RDATAN3[x] in the node 3 cycle C3 is N0DATA, and it is not the data destined for the node 3. Thus, in the node 3 cycle C3, any of the reading operation, the invalidation and the writing operation is not performed with regard to a data N0DATA on the ring bus RDATAN3[x]. Then, it is sent to a ring bus RDATAN0[x] of the next node 0 cycle C0.

On the other hand, the node 0 controller, since a valid signal VALIDN3 from the flip-flop F12 indicates a valid data (refer to FIG. 9 (8)) and also a signal IDN3[1] from the flip-flop F22 and a signal IDN3[0] from the flip-flop F32 (hereafter, referred to as IDN3[1:0]) indicate the self-node 0 (refer to FIG. 9 (12)), sets a signal VSN0 to logical "1", at the next node 0 cycle C0, as shown by an arrow (a) of FIG.

9 (refer to FIG. 9 (19)). The signal VALIDN3 is sent to the next node 0 cycle C0, and becomes a signal VALIDN0 (refer to FIG. 9 (9)). The signal IDN3[1:0] is sent to a next node 0 cycle 0 and becomes a signal IDN0[1:0] (refer to FIG. 9 (13)).

Within the node 0 controller, as shown by an arrow (b) of FIG. 9, since a signal WREQN0 indicating that write data is held is set to logical "1" (refer to FIG. 9 (16)), at the next node 0 cycle C0, the signal VDN0 is set to logical "1" (refer to FIG. 9 (18)). The node 0 controller outputs a signal IDDN0[1:0] indicative of a destination N1 of the held write data (refer to FIG. 9 (17)). Among them, the IDDN0[1] is sent to the data input terminal of the selector K20 of the flip-flop F20, and the signal IDDN0[0] is sent to the data input terminal of the selector K30 of the flip-flop F30, respectively. Moreover, the node 0 controller outputs a signal IDSN0[1:0] for selecting the destination N1 of the write data held in the data section, although this is not shown in FIG. 9. Among them, the signal IDSN0[1] is sent to the selection input terminal of the selector K20 of the flip-flop F20, and the signal IDSN0[0] is sent to the selection input terminal of the selector K30 of the flip-flop F30, respectively.

At the next node 0 cycle C0, the node 0 controller activates a read enable signal RE, since the signal IDN0[1:0] indicates the self-node 0 (refer to FIG. 9 (13)) and the signal VALIDN0 is turned on. Thus, a data N0DATA flowing through a ring bus RDATAN0[x] is captured by the node 0 data section. Also, the node 0 data section prepares the writing operation by sending a held write data N1DATA as a signal WDATAN0[x] to the selector K00 of the flip-flop F00 (refer to FIG. 9 (6)).

Under the above-mentioned conditions, the shift from the node 0 cycle C0 to the node 1 cycle C1 causes the switching of various data, as described below. That is, the node 0 controller, since the signals VSN0, VDN0 are set to logical "1" (refer to FIG. 9 (18) and (19)), activates the write enable signal WE (omitted in FIG. 9), as shown by an arrow (c) of FIG. 9. Thus, the selector K00 of the flip-flop F00 selects the signal WDATAN0[x] from the node 0 data section. As a result, the data N0DATA sent to one input terminal of the selector is thrown away (refer to FIG. 9 (3)). Then, the valid data N1DATA is outputted from the flip-flop F00 to the ring bus RDATAN1[x] (refer to FIG. 9 (4)).

Since the signals VSN0, VDN0 are set to logical "1", the selector K10 of the flip-flop F10 selects the signal VDN0 from the node 0 controller. As a result, the signal VALIDN1 is outputted from the flip-flop F10 (refer to FIG. 9 (10)).

Moreover, the signals IDSN0[1], IDSN0[0] from the node 0 controller are sent to the selection input terminals of the selectors K20, K30 of the flip-flops F20, F30, respectively. Thus, the signals IDDN0[1], IDDN0[0] from the node 0 controller are selected, respectively. As a result, the signals IDDN0[1], IDDN0[0] are outputted from the flip-flops F20, F30 as IDN1[1:0] (refer to FIG. 9 (14)).

As mentioned above, together with the operation in which the node 0 reads the data N0DATA from the ring bus 10, the operations for writing the data N1DATA to the ring bus 10, and outputting the ID indicative of the destination of the data N1DATA and the valid signal indicating that the data N1DATA is valid are executed in one cycle of the node 0 cycle C0.

Next, the node 1 controller, since a valid signal VALIDN0 from the flip-flop F13 indicates a valid data (refer to FIG. 9 (9)) and a signal IDN0[1:0] from the flip-flops F23, F33 indicates the self-node 1 (refer to FIG. 9 (17)), sets a signal VSN1 to logical "1", at the next node 1 cycle C1, as shown by an arrow (d) of FIG. 9 (refer to FIG. 9 (23)). The signal VALIDN3 is sent to the next node 0 cycle C0, and becomes the signal VALIDN0 (refer to FIG. 9 (9)).

Within the node 1 controller, as shown by an arrow (e) of FIG. 9, since a signal WREQ1 indicating that write data is held is set to logical "1" (refer to FIG. 9 (20)), at the next node 1 cycle C1, the signal VDN1 is set to logical "1" (refer to FIG. 9 (22)). The node 1 controller outputs a signal IDDN1[1:0] indicative of a destination N3 of the held write data (refer to FIG. 9 (21)). Among them, the signal IDDN1[1] is sent to the data input terminal of the selector K21 of the flip-flop F21, and the signal IDDN1[0] is sent to the data input terminal of the selector K31 of the flip-flop F31, respectively. Moreover, the node 1 controller outputs a signal IDSN1[1:0] for selecting the destination N3 of the write data held in the data section, although this is not shown in FIG. 9. Among them, the signal IDSN1[1] is sent to the selection input terminal of the selector K21 of the flip-flop F21, and the signal IDSN1[0] is sent to the selection input terminal of the selector K31 of the flip-flop F31, respectively.

At the next node 1 cycle C1, the node 1 controller activates a read enable signal (not shown), since a signal IDN1[1:0] indicates the self-node 1 (refer to FIG. 9 (14)) and also the signal VALIDN1 is turned on. Thus, a data N1DATA flowing through a ring bus RDATAN1[x] is captured by the node 1 data section. Also, the node 1 data section prepares the writing operation by sending a held write data N3DATA as a signal WDATAN1[x] to the selector K01 of the flip-flop F01 (refer to FIG. 9 (7)), and then.

Under the above-mentioned conditions, the shift from the node 1 cycle C1 to the node 2 cycle C2 causes the switching of various data, as described below. That is, the node 1 controller, since the signals VSN1, VDN1 are set to logical "1" (refer to FIG. 9 (22) and (23)), activates the write enable signal (not shown), as shown by an arrow (f) of FIG. 9. Thus, the selector K01 of the flip-flop F01 selects the signal WDATAN1[x] from the node 1 data section. As a result, the data N1DATA sent to one input terminal of the selector is thrown away (refer to FIG. 9 (4)). Then, the valid data N3DATA is outputted from the flip-flop F01 to the ring bus RDATAN2[x] (refer to FIG. 9 (2)).

Since the signal VSN1 is set to logical "1", the selector K11 of the flip-flop F11 selects the signal VDN1 from the node 1 controller. As a result, the signal VALIDN2 is outputted from the flip-flop F11 (refer to FIG. 9 (12)).

Moreover, the signals IDSN1[1], IDSN1[0] from the node 1 controller are sent to the selection input terminals of the selectors K21, K31 of the flip-flops F21, F31, respectively. Thus, the signals IDDN1[1], IDDN1[0] from the node 1 controller are selected, respectively. As a result, the signals IDDN1[1], IDDN1[0] are outputted from the flip-flops F21, F31 as IDN2[1:0] (refer to FIG. 9 (15)). After that, the similar operations are repeated.

In the above-mentioned explanation, the case is described in which the nodes 0, 1 receive the data from the ring bus and also hold the write data to be sent out to the ring bus. However, if the write data is not held, the invalidation is executed. This invalidation is executed by preventing the output of the write enable signal and also clearing the signal VALID, in the above-mentioned writing operation.

As mentioned above, this data transferring apparatus uses the two methods to detect whether or not the valid data destined for the self-node is present. In the first method, when the node at least two nodes upstream from the self-node executes the writing operation, the data transferring apparatus refers to the valid signal arrived to the adjacent node on the upstream side of the self-node to thereby judge whether or not the valid data destined for the self-node is present. In the second method, when the adjacent node on the upstream side of the self-node executes the writing operation, since the reference to the valid signal delays the judgment as to whether or not the self-node can execute the writing operation, it refers to the signals VDN0 to VDN3 and the signals VSN0 to VSN3 having the meaning similar to that of the valid signal to thereby judge whether or not the valid data destined for the self-node is present. The arrows (d) and (e) of FIG. 9 correspond to this judgment.

In the data transferring apparatus according to the first example of the present invention, a certain node investigates the state of the node on the upstream side therefrom, and if the valid data destined for the self-node is present, captures it at the next self-node cycle. At this time, if the certain node holds the write data to be sent out to the ring bus, it sends out the write data to the ring bus at the same cycle, and if it does not hold, it executes invalidation. Thus, the reading operation and the writing operation or the invalidation are executed in the same cycle. Hence, the transfer efficiency of the data can be improved since the unnecessary data does not make a round of the ring bus, differently from the conventional information processing system.

The judgment of the presence or absence of the valid data destined for the self-node and the determination of the destination are done by using the ID given to each node and one valid line. So, this data transferring apparatus has the merit that the circuit configuration is simple. Also, in the above-mentioned explanation, the case is described in which only one valid data is present in the four node cycles. However, a maximum of four valid data (equal to the number of nodes) may be present on the ring bus.

SECOND EXAMPLE

A data transferring apparatus according to a second example of the present invention will be described below. The schematically described data transferring apparatus is further embodied in the data transferring apparatus according to the second example. This data transferring apparatus uses four valid lines assigned to respective nodes to thereby check whether or not the packet destined for the self-node is present in the slot arrived to the adjacent node on the upstream side of the self-node.

Figure 10:
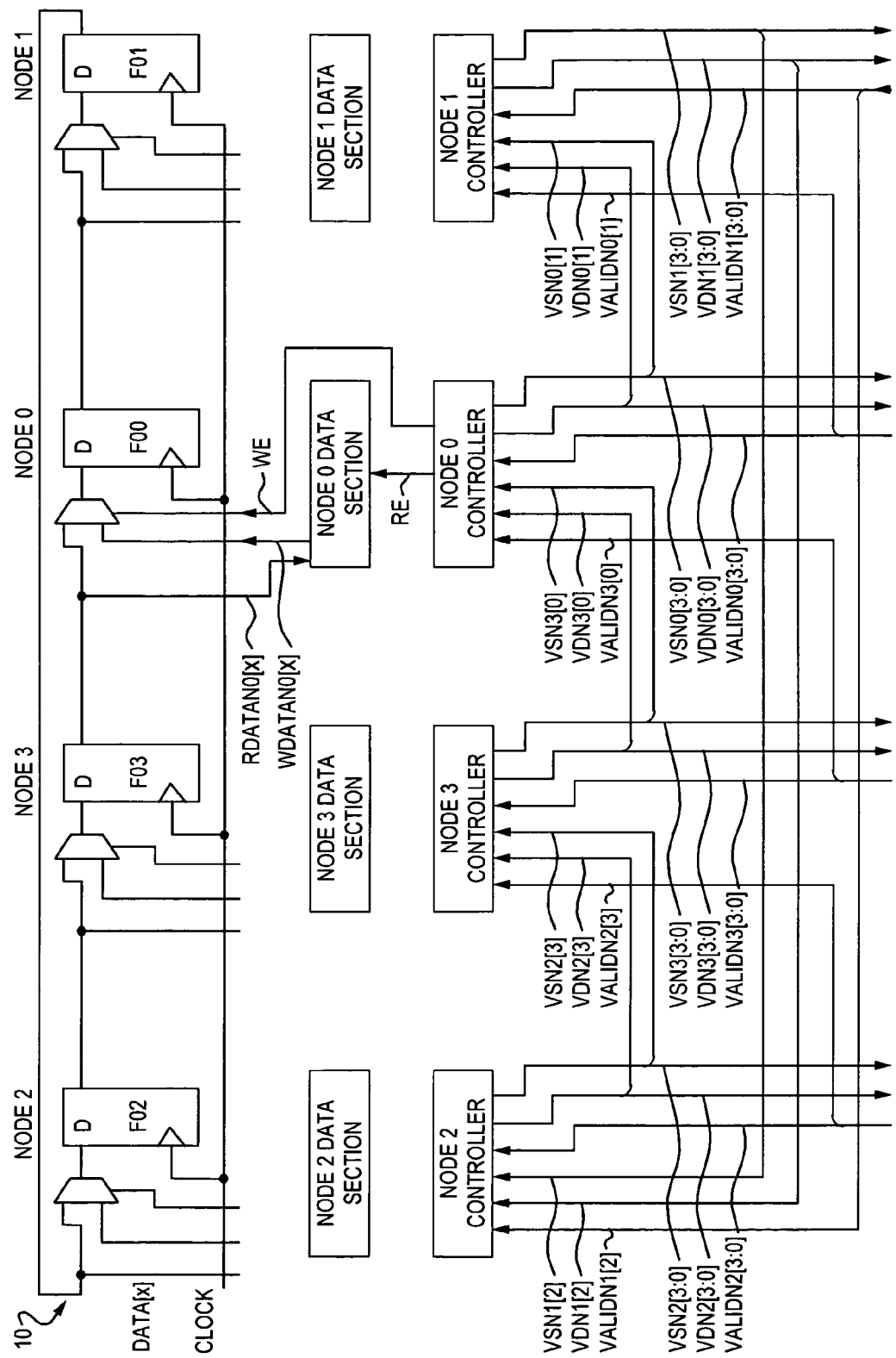
FIG. 10 is a part of a block diagram showing a configuration of a data transferring apparatus according to a second embodiment of the present invention.
Figure 11:
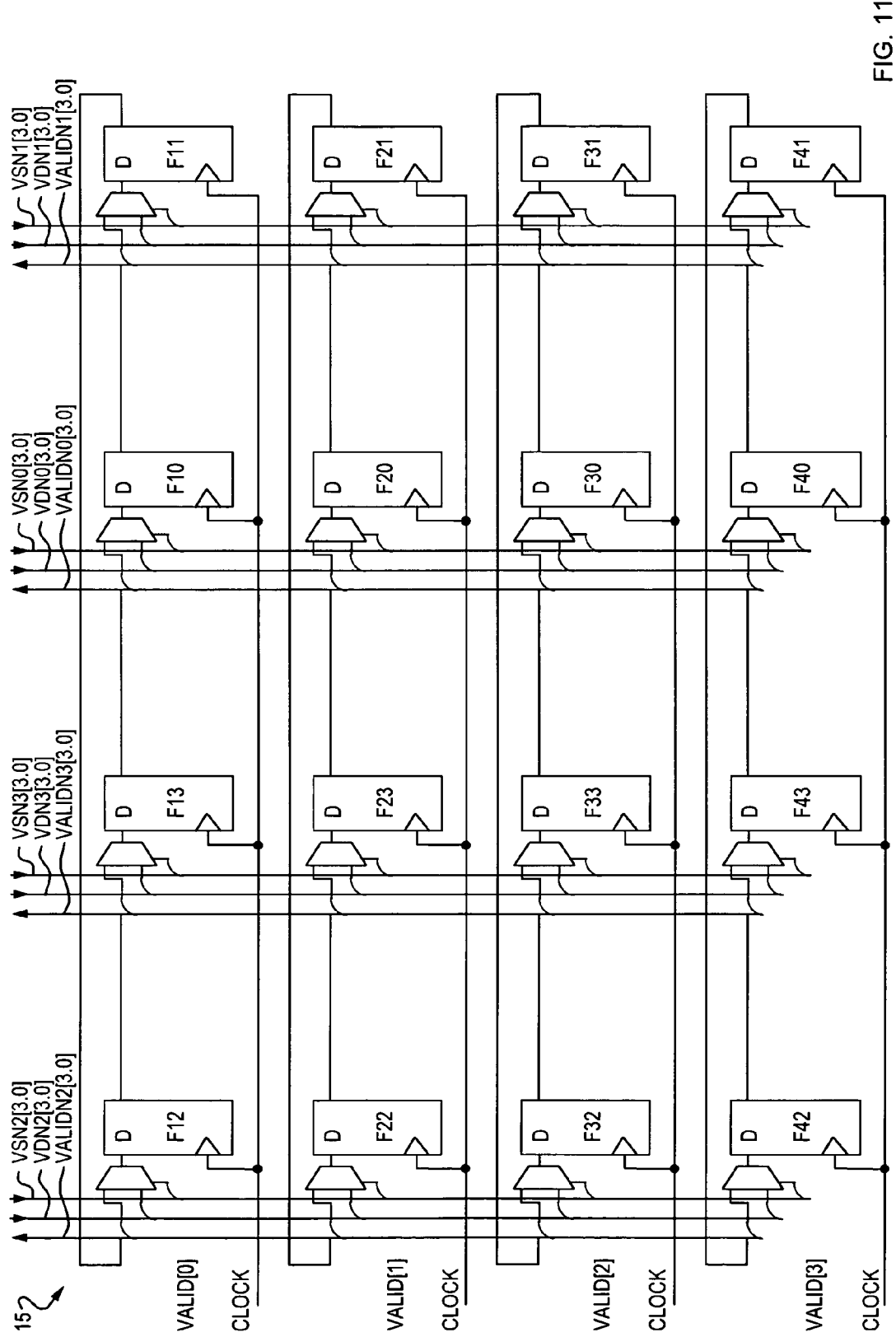
FIG. 11 is another part of the block diagram showing the configuration of the data transferring apparatus according to the second embodiment of the present invention.

FIGS. 10 and 11 are block diagrams showing the configuration of the data transferring apparatus according to the second example. This data transferring apparatus is composed of a ring bus 10, a valid line 15, a node 0, a node 1, a node 2 and a node 3. Also, the node 0 is composed of a node 0 data section and a node 0 controller. The node 1 is composed of a node 1 data section and a node 1 controller. The node 2 is composed of a node 2 data section and a node 2 controller. Also, the node 3 is composed of a node 3 data section and a node 3 controller. The valid line 15 is composed of a first valid line Valid [0], a second valid line Valid [1], a third valid line Valid [2] and a fourth valid line Valid [3] (hereafter, collectively referred to as Valid[3:0]).

The configuration of the ring bus 10 is equal to that of the data transferring apparatus according to the first example. The first valid line VALID [0] indicates that a data of the node 0 is valid in each cycle. This first valid line VALID[0] is configured such that four D-type flip-flops F10 to F13 having selectors at data input terminals, respectively, are connected in a form of ring. The flip-flops F10 to F13 correspond to the nodes 0 to 3, respectively. A clock is commonly supplied to the respective flip-flops. A signal VALIDN0[0] from the flip-flop F13 is sent to one input terminal of the selector provided at the flip-flop F10, and a signal VDN0[0] from the node 0 controller is sent to another input terminal of the selector. A signal VSN0[0] from the node 0 controller is also sent to a selection terminal of the selector. The configurations of the circuits around the other flip-flops F11 to F13 are similar to that of the flip-flop F10.

The configurations of the second valid line VALID [1], the third valid line VALID [2] and the fourth valid line VALID [3] are also similar to that of the first valid line VALID [0].

Signals VALIDN0[3:0] from the flip-flops F13, F23, F33 and F43 are inputted to the node 0 controller, as a signal arrived to the node 0. A signal VALIDN3[0] from the flip-flop F12 is inputted as a signal arrived to the adjacent node 3 on the upstream side of the node 0. Moreover, signals VDN3[0], VSN3[0] from the adjacent node 3 controller on the upstream side of the node 0 are inputted to the node 0 controller.

Signals VALIDN1[3:0] from the flip-flops F10, F20, F30 and F40 are inputted to the node 1 controller, as a signal arrived to the node 1. A signal VALIDN0[1] from the flip-flop F23 is inputted as a signal arrived to the adjacent node 0 on the upstream side of the node 1. Moreover, signals VDN0[1], VSN0[1] from the adjacent node 0 controller on the upstream side of the node 1 are inputted to the node 1 controller.

Signals VALIDN2[3:0] from the flip-flops F11, F21, F31 and F41 are inputted to the node 2 controller, as a signal arrived to the node 2. A signal VALIDN1[2] from the flip-flop F30 is inputted as a signal arrived to the adjacent node 1 on the upstream side of the node 2. Moreover, signals VDN1[2], VSN1[2] from the adjacent node 1 controller on the upstream side of the node 2 are inputted to the node 2 controller.

Signals VALIDN3[3:0] from the flip-flops F12, F22, F32 and F42 are inputted to the node 3 controller, as a signal arrived to the node 3. A signal VALIDN2[3] from the flip-flop F41 is inputted as a signal arrived to the adjacent node 2 on the upstream side of the node 3. Moreover, signals VDN2[3], VSN2[3] from the adjacent node 2 controller on the upstream side of the node 3 are inputted to the node 3 controller.

The operations of the data transferring apparatus having the above-mentioned configuration will be described below with reference to a timing chart shown in FIG. 12. This timing chart shows the case of the operation under the above-mentioned conditions 1 to 3.

Figure 12:
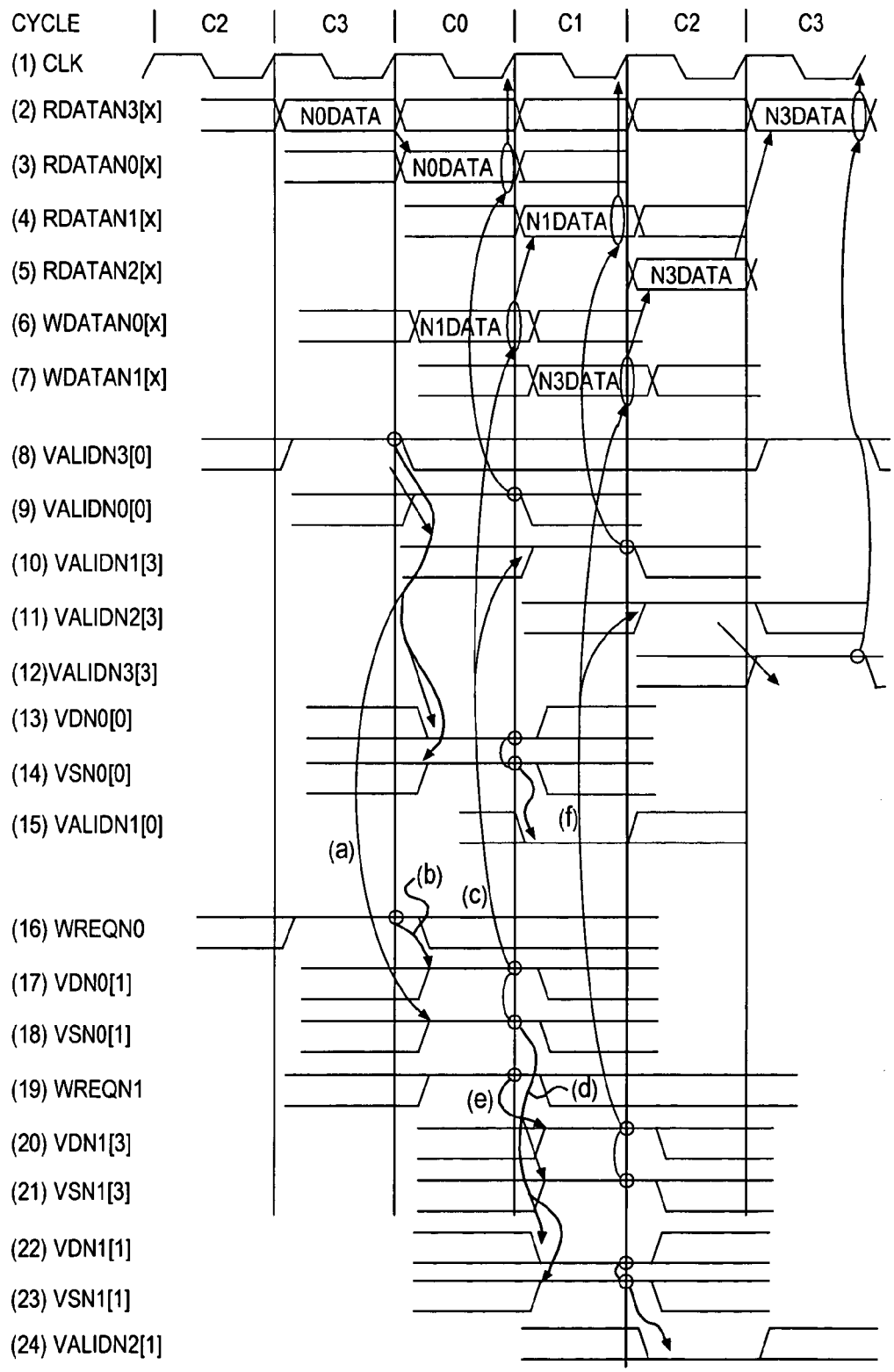
FIG. 12 is a timing chart showing an operation of the data transferring apparatus shown in FIGS. 10 and 11.

First, as shown in FIG. 12 (2), a valid data on a ring bus RDATAN3[x] in the node 3 cycle C3 is N0DATA, and it is not the data destined for the node 3. Thus, in the node 3 cycle C3, any of the reading operation, the invalidation and the writing operation is not executed with regard to a data N0DATA on the ring bus RDATAN3[x]. Then, it is sent to a ring bus RDATAN0[x] of the next node 0 cycle C0.

On the other hand, the node 0 controller, since a valid signal VALIDN3[0] from the flip-flop F12 is set to logical "1" and the presence of the valid data destined for the self-node 0 is indicated (refer to FIG. 12 (8)), resets the signal VDN0[0] to logical "0" (refer to FIG. 12 (13)) in order to invalidate the data destined for the self-node 0 at the next node 0 cycle C0, and sets a signal VSN0[0] to logical "1" (refer to FIG. 12 (14)). Also, the node 0 data section holds write data destined for the node 1. Thus, as shown by an arrow (a) of FIG. 12, a signal VSN0[1] is set to logical "1", at the next node 0 cycle C0 (refer to FIG. 12 (18)). The signal VALIDN3[0] is sent to the next node 0 cycle C0, and becomes a signal VALIDN0[0] (refer to FIG. 12 (9)).

Within the node 0 controller, as shown by an arrow (b) of FIG. 12, since a signal WREQN0 indicating that write data is held is set to logical "1" (refer to FIG. 12 (16)) and the write data is destined for the node 1, at the next node 0 cycle C0, the signal VDN0[1] is set to logical "1" (refer to FIG. 12 (17)).

At the next node 0 cycle C0, the node 0 controller activate a read enable signal RE, since a signal VALIDN0[0] is turned on. Accordingly, a data N0DATA flowing through a ring bus RDATAN0[x] is captured by the node 0 data section. Also, the node 0 data section prepares the writing operation by sending a held write data N1DATA as a signal WDATAN0[x] to the selector of the flip-flop F00 (refer to FIG. 12 (6)).

Under the above-mentioned conditions, the shift from the node 0 cycle C0 to the node 1 cycle C1 causes the switching of various data, as described below. That is, the node 0 controller, since the signals VSN0[1], VDN0[1] are set to logical "1" (refer to FIG. 12 (17) and (18)), active the write enable signal WE (omitted in FIG. 12), as shown by an arrow (c) of FIG. 12. Thus, the selector of the flip-flop F00 selects the signal WDATAN0[x] from the node 0 data section. As a result, the data N0DATA sent to one input terminal of the selector is thrown away (refer to FIG. 12 (3)). Then, the valid data N1DATA is outputted from the flip-flop F00 to the ring bus RDATAN1[x] (refer to FIG. 12 (4)).

Also, since the signals VSN0[1], VDN0[1] are set to logical "1", the selector of the flip-flop F20 selects the signal VDN0[1] from the node 0 controller in order to recognize that the node 0 writes the valid data destined for the node 1 onto the ring bus 10. As a result, the signal VALIDN1[1] is outputted from the flip-flop F20 (refer to FIG. 12 (10)). Also, since the signal VDN0 is reset to logical "0" (refer to FIG. 12 (13)) and the signal VSN0[0] is set to logical "1" (refer to FIG. 12 (14)), at the next node 1 cycle C1, the signal VALIDN1[0] is reset to logical "0" (refer to FIG. 12 (15)). Accordingly, the data destined for the self-node 0 is invalidated.

As mentioned above, together with the operation in which the node 0 reads the data N0DATA from the ring bus 10, the operations for writing the data N1DATA to the ring bus 10 and outputting the valid signal VALIDN1[1] indicating that the data N1DATA is valid are executed in one cycle of the node 0 cycle C0.

Next, the node 1 controller, since the signals VSN0[1], VDN0[1] are set to logical "1" and the presence of the valid data destined for the self-node 1 is indicated, sets a signal VSN1[3] to logical "1", at the next node 1 cycle C1, as shown by an arrow (d) of FIG. 12 (refer to FIG. 12 (21)). Also, the node 1 controller resets the signal VDN1[1] to logical "0" in order to invalidate the data destined for the self-node 1 (refer to FIG. 12 (22)), and sets the signal VSN1[1] to logical "1" (refer to FIG. 12 (23)).

Within the node 1 controller, as shown by an arrow (e) of FIG. 12, a signal WREQN1 indicating that write data is held is set to logical "1" (refer to FIG. 12 (19)) and the held write data is destined for the node 3, at the next node 1 cycle C1, the signal VDN1[3] is set to logical "1" (refer to FIG. 12 (20)).

At the next node 1 cycle C1, the node 1 controller actives a read enable signal RE, since the signal VALIDN1[1] is turned on. Accordingly, a data N1DATA flowing through a ring bus RDATAN1[x] is captured by the node 1 data section. Also, the node 1 data section prepares the writing operation by sending a held write data N3 DATA as a signal WDATAN1[x] to the selector of the flip-flop F01 (refer to FIG. 12 (7)).

Under the above-mentioned conditions, the shift from the node 1 cycle C1 to the node 2 cycle C2 causes the switching of various data, as described below. That is, the node 1 controller, since the signals VSN1[3], VDN1[3] are set to logical "1" (refer to FIG. 12 (20) and (21)), actives the write enable signal WE (omitted in FIG. 12), as shown by an arrow (f) of FIG. 12. Thus, the selector of the flip-flop F01 selects the signal WDATAN1[x] from the node 1 data section. As a result, the data N1DATA sent to one input terminal of the selector is thrown away (refer to FIG. 12 (3)). Then, the valid data N3DATA is outputted from the flip-flop F01 to the ring bus RDATAN2[x] (refer to FIG. 12 (5)).

Also, since the signals VSN1[3], VDN1[3] are set to logical "1", the selector of the flip-flop F41 selects the signal VDN1[3] from the node 1 controller in order to recognize that the node 1 writes the valid data destined for the node 3 onto the ring bus 10. As a result, the signal VALIDN2[3] is outputted from the flip-flop F41 (refer to FIG. 12 (11)). The signal VDN1[1] is reset to logical "0" (refer to FIG. 12 (22)), and the signal VSN1[1] is set to logical "1" (refer to FIG. 12 (23)). So, at the next node 2 cycle C2, the signal VALIDN2[1] is reset to logical "0" (refer to FIG. 12 (24)). Thus, the data destined for the self-node 1 is invalidated. After that, the similar operations are repeated.

In the above-mentioned explanation, the case is described in which the nodes 0, 1 receive the data from the ring bus and also hold the write data to be sent out to the ring bus. However, if the write data is not held, because the writing operation in the Valid line having the same node number as the write destination is not performed, the invalidation is executed.

As mentioned above, even this data transferring apparatus uses the two methods to detect whether or not the valid data destined for the self-node is present, similarly to the first example. By the way, when the adjacent node on the upstream side of the self-node performs writing operation, it is judged whether or not the valid data destined for the self-node is present by operating as shown by the arrows (d) and (e) in FIG. 12.

The data transferring apparatus according to the second example can provide the effect similar to that of the data transferring apparatus according to the first example. Also, the judgment of the presence or absence of the valid data destined for the self-node and the determination of the destination are done by using the four valid lines. So, this has the merit that the data transferring apparatus is easily controlled. Also, according to the second example, it is possible to attain a broadcast transfer, in which the valid lines corresponding to the respective nodes are merely turned on to then transfer the data not only to a particular node but also all the nodes, at the same time.

The above-mentioned data transferring apparatus can be assembled into logic of SOC (Silicon On Chip). This configuration can provide the various effects, which are the merits of the ring connection system.

As mentioned above, the present invention can provide the data transferring apparatus and the data transferring method which can improve the usage efficiency of the ring bus.

What is claimed is:
1. A data transferring apparatus, comprising:
a ring bus which circularly transfers data by holding in a slot to one direction; and
a plurality of nodes which are connected to said ring bus, wherein each of said plurality of nodes includes:
a detector which detects whether or not data destined for a self-node is held in a slot arrived to another node connected to an upstream side of the self-node; and
a controller which captures the data destined for the self-node from said slot when said detector detects presence of the data destined for the self-node and said slot arrives to the self-node, wherein said controller controls validation of said slot arrived at the self-node in a same cycle as capturing said data destined for the self-node.

2. A data transferring apparatus, comprising:
a ring bus which circularly transfers data by holding in a slot to one direction; and
a plurality of nodes which are connected to said ring bus, wherein each of said plurality of nodes includes:
  a detector which detects whether or not data destined for a self-node is held in a slot arrived to another node connected to an upstream side of the self-node; and
  a controller which captures the data destined for the self-node from said slot when said detector detects presence of the data destined for the self-node and said slot arrives to the self-node, wherein said controller, when not maintaining write data to be transferred, invalidates said arrived slot after capturing the data destined for the self-node.

3. The data transferring apparatus according to claim 2, wherein said controller, when maintaining the write data, sends out the write data to said ring bus to transfer the write data by holding in said arrived slot after capturing the data destined for the self-node.

4. The data transferring apparatus according to claim 3, wherein said detector includes:
  an ID line which circularly transfers an ID signal indicative of a destination of the write data in synchronization with the transfer of the write data; and
  a valid line which circularly transfers a valid signal indicative of presence of the write data on said ring bus in synchronization with the transfer of the write data, and
  wherein when the ID signal arrived to said other node indicates the self-node as the destination and the valid signal arrived to said other node indicates presence of the write data, said detector detects presence of the write data destined for the self-node.

5. The data transferring apparatus according to claim 4, wherein said controller, when maintaining the write data to be transferred to a downstream node on an adjacent downstream side of the self-node, directly sends out the valid signal and the ID signal to said downstream node.

6. The data transferring apparatus according to claim 3, wherein said detector includes:
  a valid line assigned for the self-node, wherein a valid signal indicative of the presence of the write data on said ring bus is circularly transferred on said valid line in synchronization with the transfer of the write data, and
  wherein when the valid signal arrived to said other node indicates presence of the write data, said detector detects presence of the write data destined for the self-node.

7. The data transferring apparatus according to claim 6, wherein said controller, when maintaining the write data to be transferred to a downstream node on an adjacent downstream side of the self-node, directly sends out the valid signal to the downstream node.

8. A data transferring method, comprising:
providing a plurality of nodes connected to a ring bus which circularly transfers data by holding in a slot to one direction;
detecting whether or not data destined for a self-node is held in a slot arrived to another node connected to an upstream side of the self-node;
capturing the data destined for the self-node from said slot when presence of the data destined for the self-node is detected in said detecting step and said slot arrives to the self-node; and
controlling validation of said slot arrived at the self-node in a same cycle as capturing the data destined for the self-node.

9. A data transferring method, comprising:
providing a plurality of nodes connected to a ring bus which circularly transfers data by holding in a slot to one direction;
detecting whether or not data destined for a self-node is held in a slot arrived to another node connected to an upstream side of the self-node; and
capturing the data destined for the self-node from said slot when presence of the data destined for the self-node is detected in said detecting step and said slot arrives to the self-node, wherein said capturing step, when write data to be transferred is not maintained, invalidates said arrived slot after capturing the data destined for the self-node.

10. The data transferring method according to claim 9, wherein said capturing step, when the write data is maintained, sends out the write data to said ring bus to transfer the write data by holding in said arrived slot after capturing the data destined for the self-node.

11. The data transferring method according to claim 10, wherein said detecting step includes:
circularly transferring an ID signal indicative of a destination of the write data in synchronization with the transfer of the write data; and
circularly transferring a valid signal indicative of the presence of the write data on said ring bus in synchronization with the transfer of the write data, and
wherein when the ID signal arrived to said other node indicates the self-node as the destination and the valid signal arrived to said other node indicates presence of the write data, said detecting step detects presence of the write data destined for the self-node.

12. The data transferring method according to claim 11, wherein said capturing step, when the write data to be transferred to a downstream node on an adjacent downstream side of the self-node is maintained, directly sends out the valid signal and the ID signal to said downstream node.

13. The data transferring method according to claim 10, wherein said detecting step includes:
assigning a valid signal for the self-node,
circularly transferring the valid signal indicative of the presence of the write data on said ring bus in synchronization with the transfer of the write data, and
wherein the valid signal arrived to said other node indicates presence of the write data, said detecting step detects presence of the write data destined for the self-node.

14. The data transferring method according to claim 13, wherein said capturing step, when the write data to be transferred to a downstream node on an adjacent downstream side of the self-node is maintained, directly sends out the valid signal and the ID signal to said downstream node.

* * * * *